US006446028B1

United States Patent
Wang

(10) Patent No.: US 6,446,028 B1
(45) Date of Patent: Sep. 3, 2002

(54) METHOD AND APPARATUS FOR MEASURING THE PERFORMANCE OF A NETWORK BASED APPLICATION PROGRAM

(75) Inventor: George R. Wang, Los Altos, CA (US)

(73) Assignee: Keynote Systems, Inc., San Mateo, CA (US)

( * ) Notice: Subject to any disclaimer, the term of this patent is extended or adjusted under 35 U.S.C. 154(b) by 0 days.

(21) Appl. No.: 09/199,972

(22) Filed: Nov. 25, 1998

(51) Int. Cl.$^7$ ................................................. G06F 11/30
(52) U.S. Cl. ....................... 702/186; 702/187; 702/122; 702/188
(58) Field of Search ................................. 702/122, 119, 702/176–178, 179, 182, 183, 186, 187, 188, FOR 103, FOR 104, FOR 134, FOR 135, FOR 139, FOR 170, FOR 171; 709/223–226; 714/47, 51, 55; 370/229–237

(56) References Cited

U.S. PATENT DOCUMENTS

| | | | | |
|---|---|---|---|---|
| 5,359,323 A | * | 10/1994 | Michel ................... | 340/825.54 |
| 5,457,797 A | * | 10/1995 | Butterworth et al. ....... | 395/650 |
| 5,511,230 A | * | 4/1996 | Ryu ........................ | 395/865 |
| 6,011,790 A | * | 6/1996 | Fisher ..................... | 370/349 |
| 5,675,798 A | * | 10/1997 | Chang ..................... | 395/680 |
| 6,115,157 A | * | 12/1997 | Barnard et al. ............ | 359/124 |
| 6,141,759 A | * | 12/1997 | Braddy .................... | 713/201 |
| 5,715,403 A | * | 2/1998 | Stefik ...................... | 395/244 |
| 5,844,888 A | * | 12/1998 | Markkula, Jr. et al. ..... | 370/255 |
| 6,018,619 A | * | 1/2000 | Allard et al. ............. | 395/200.54 |
| 6,046,979 A | * | 4/2000 | Bauman ................... | 370/229 |
| 6,055,493 A | * | 4/2000 | Ries et al. ................. | 702/186 |
| 6,061,724 A | * | 5/2000 | Ries et al. ................. | 709/224 |
| 6,070,190 A | * | 5/2000 | Reps et al. ................ | 709/224 |
| 6,078,956 A | * | 6/2000 | Bryant et al. ............. | 709/224 |
| 6,115,393 A | * | 9/2000 | Engel et al. .............. | 370/469 |
| 6,144,992 A | * | 11/2000 | Turpin et al. ............. | 709/208 |
| 6,148,335 A | * | 11/2000 | Haggard et al. ........... | 709/224 |
| 6,157,942 A | * | 12/2000 | Chu et al. ................. | 709/203 |
| 6,163,853 A | * | 12/2000 | Findlay et al. ............ | 714/4 |
| 6,167,446 A | * | 12/2000 | Lister et al. .............. | 709/223 |
| 6,178,160 B1 | * | 1/2001 | Bolton et al. ............. | 370/255 |
| 6,216,163 B1 | * | 4/2001 | Bharali et al. ............ | 709/227 |
| 6,269,401 B1 | * | 7/2001 | Fletcher et al. ........... | 709/224 |
| 6,363,477 B1 | * | 3/2002 | Fletcher et al. ........... | 713/151 |

FOREIGN PATENT DOCUMENTS

WO     WO 01/20918 A2 * 3/2001

\* cited by examiner

*Primary Examiner*—Marc S. Hoff
*Assistant Examiner*—Carol S Tsai
(74) *Attorney, Agent, or Firm*—Ritter, Lang & Kaplan LLP

(57) ABSTRACT

A client-server software performance monitor system is disclosed. In the system of the present invention, a performance monitor machine is coupled to a computer network in close network proximity to one or more server systems that are to be monitored. The performance monitor machine monitors all network communication originating from or addressed to the server system to determine client-server transaction times. The performance monitor machine calculates a server processing time by subtracting the time when the server system receives the request packet from a client system from the time when the server system sends the first response packet back to the client system. The performance monitor machine also calculates an network transit time by subtracting said time when the server system receives the final acknowledgement packet from the time when said server system sent the first response packet to the client system. The performance monitor machine calculates an approximate total client observed response time by adding the server processing time and the approximate network transit time.

22 Claims, 11 Drawing Sheets

METHOD AND APPARATUS FOR MEASURING THE PERFORMANCE OF A NETWORK BASED APPLICATION PROGRAM

FIELD OF THE INVENTION

The present invention relates to the field of computer software measurement tools. In particular, the present invention discloses a method and apparatus for determining the performance of a client-server based application.

BACKGROUND OF THE INVENTION

Since the 1980's there has been a paradigm shift in the enterprise computer system industry away from enterprise programs running on mainframes that are accessed by "dumb" terminals towards client-server enterprise systems. Furthermore, there has been a shift from local access to remote access using a computer network. A client-server enterprise system has an intelligent client application that is used by an end user and a server computer system that stores large amount of information. The client application consults the server computer system across a computer network when the client application needs information or services provided by the server. The computer network may be a local area network, a private wide area network, a virtual private network built using encryption tunnels on a public network, or a public network such as the global Internet. A single computer server may be used to serve multiple client applications running on multiple different client systems.

To determine how well an enterprise application is performing, performance monitoring hardware and/or software is used. The task of monitoring performance of a mainframe/terminal computer application is relatively simple. Monitoring the performance of a mainframe/terminal computer application is simple because the user's terminal is a direct local connection between the terminal and the mainframe. Therefore, no significant performance variations are introduced by the direct local connection. Furthermore, the user's "dumb" terminal will usually behave in a deterministic manner such that no significant performance variations are introduced by the dumb terminal. Thus, to monitor the performance of a mainframe/terminal computer application an information systems person only needs to monitor the performance of the mainframe computer.

The task of monitoring the performance of a client-server application is not nearly as simple. In a client-server system there are many potential bottlenecks. For example, the client application may be misconfigured, the client computer may be underpowered, the computer network link may be saturated, a router or bridge on the network may be inoperative, the server system may be overloaded, or a database accessed by the server application may be slow. Thus, the task of monitoring a distributed client-server application is quite difficult. It would be desirable to have a client-server performance monitoring system that is simple to install, simple to operate, and provides a detailed description of where in the client-server system a performance problem is originating.

SUMMARY OF THE INVENTION

A client-server software performance monitor system is disclosed. In the system of the present invention, a performance monitor machine is coupled to a computer network in close network proximity to one or more server systems that are to be monitored. The performance monitor machine monitors all network communication originating from or addressed to the server system. The performance monitor machine determines client-server transaction times using the times of network packets that are detected.

The performance monitor machine detects client requests sent to the server system to determine a time when the server system receives a request packet from a client system. The performance monitor machine then detects one or more response packets addressed to the client system that sent the request. Each response packet is time-stamped to record the time or times when the server system sent each response packet to the client system. Finally, the performance monitor machine detects one or more acknowledgement packets from the client system that acknowledge receipt of the server response packets.

The performance monitor machine calculates a server processing time by subtracting the time when the server system receives the request packet from a client system from the time when the server system sends the first response packet back to the client system. The performance monitor machine also calculates a network transit time by subtracting said time when the server system receives a final acknowledgement packet from the time when said server system sent the first response packet to the client system. The performance monitor machine calculates an approximate total client observed response time by adding the server processing time and the approximate network transit time.

Other objects, features, and advantages of present invention will be apparent from the company drawings and from the following detailed description.

BRIEF DESCRIPTION OF THE DRAWINGS

The objects, features and advantages of the present invention will be apparent to one skilled in the art, in view of the following detailed description in which.

DETAILED DESCRIPTION OF THE PREFERRED EMBODIMENT

A method and apparatus for measuring the performance of a client-server based application program is disclosed. In the following description, for purposes of explanation, specific nomenclature is set forth to provide a thorough understanding of the present invention. However, it will be apparent to one skilled in the art that these specific details are not required in order to practice the present invention. For example, the present invention has been described with reference to the SAP R/3 enterprise resource-planning program. However, the same techniques can easily be applied to other types of client-server applications.

A Client-Server Environment

Figure 1:
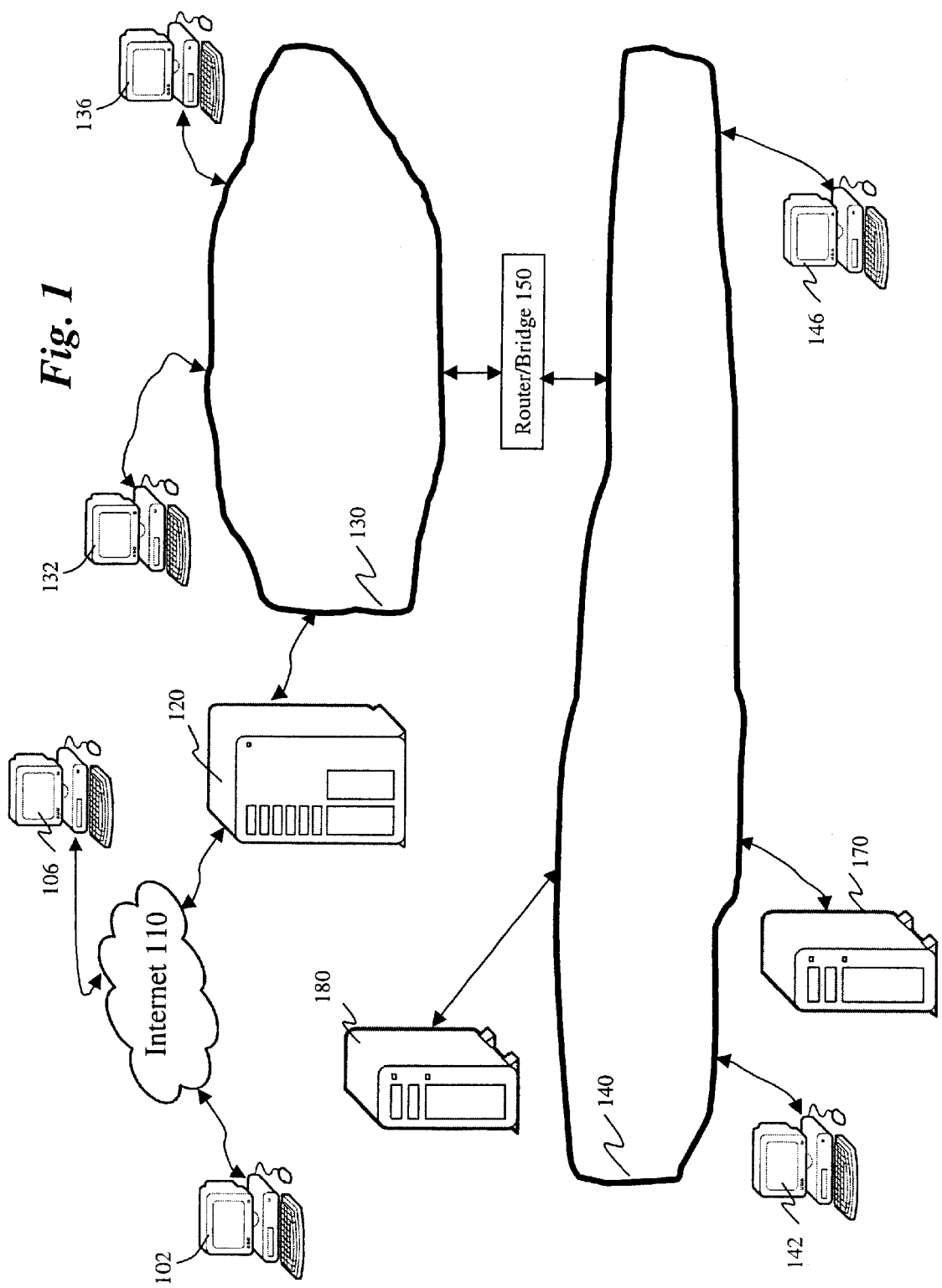
FIG. 1 illustrates a diagram of a client-server computer system arrangement.
Figure 2:
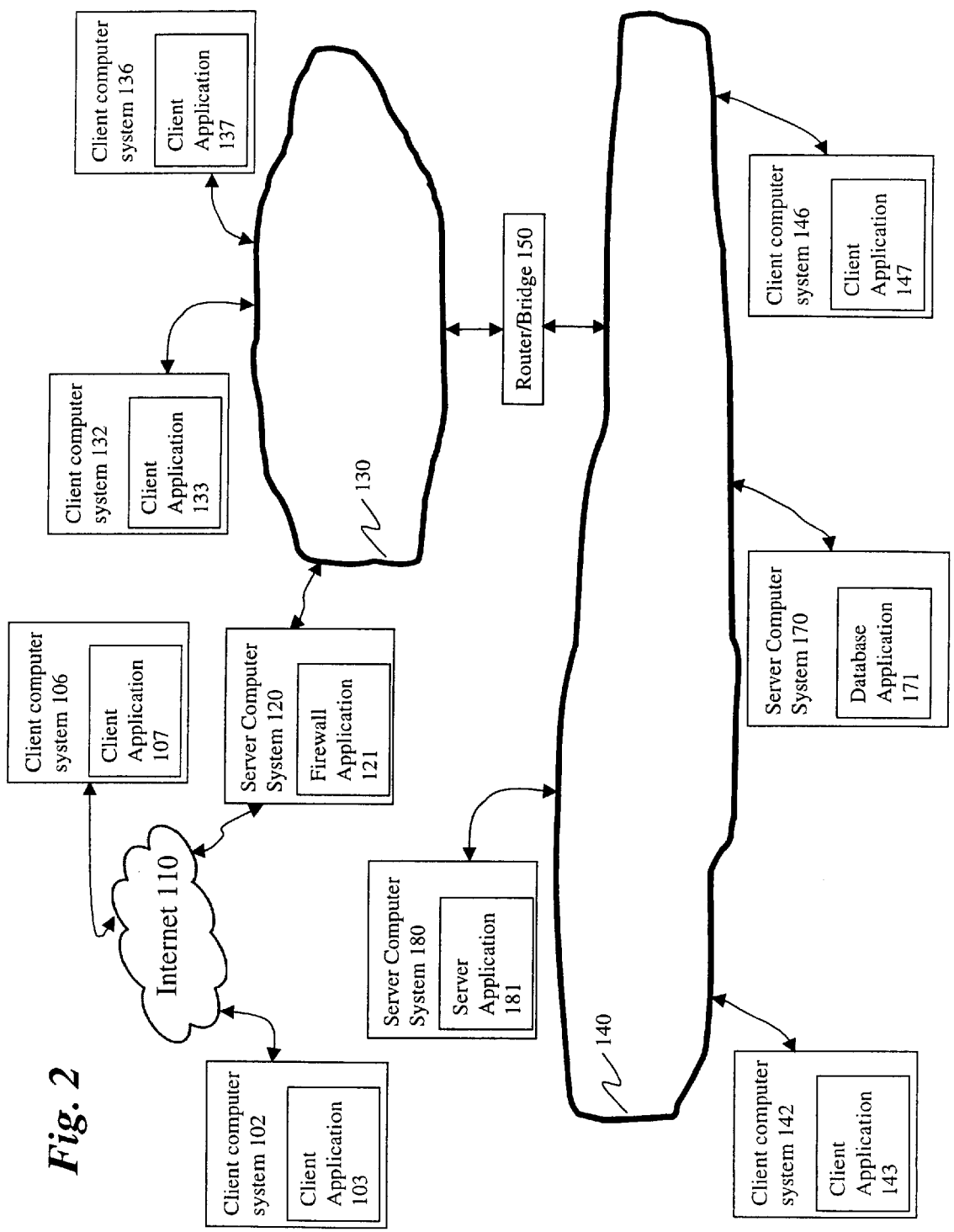
FIG. 2 illustrates block diagram of the client-server computer system arrangement illustrated in FIG. 1.

FIG. 1 illustrates one possible client-server environment. In the client-server environment of FIG. 1 there are several end user client computer systems 102, 106, 132, 136, 142, and 146 coupled to a computer network. Each client system may be a personal computer, workstation, or other intelligent terminal system. FIG. 2 provides a block diagram of the client-server embodiment of FIG. 1. As illustrated in FIG. 2, each client computer systems 102, 106, 132, 136, 142, and 146 runs a client application program 103, 107, 133, 137, 143, and 147 respectively. The client application provides a user interface that requests input from and displays output information to an end user.

The computer network of FIG. 1 is comprised of several individual network components. Specifically, there are two individual Local Area Networks (LANs) 130 and 140. The two LANs 130 and 140 are coupled together using a router or network bridge 150. The LANs 130 and 140 are also coupled to the global Internet 110 through a firewall 120 (having a firewall application 121). With a proper network configuration, any computer system coupled to LAN 130, LAN 140, or Internet 110 can communicate with any other computer system coupled to LAN 130, LAN 140, or Internet 110.

The client applications on each client system communicate across the network arrangement with a server application 181 running on server system 180. The server application 181 provides information and services to the client applications that access the server application 181. In general, a client system will make a request to the server application 181 running on server system 180. The server application 181 running on server system 180 will then respond to the request by providing a response back to the client system.

In one embodiment, the server application 181 is a SAP R/3 Server Application from SAP AG, of Walldorf, Germany. In such a client-server system, each client system needs to execute an associated SAP R/3 client application program.

In the client-server arrangement of FIGS. 1 and 2, the server application 181 running on server system 180 refers to a database application 171 running on server system 170. Thus, the server application 181 running on server system 180 sends database requests to the database application 171 running on server system 170. The database application 171 running on server system 170 responds by providing requested data back to the server application 181 or storing the data provided by server application 181 into the database.

Prior Art Performance Measuring

Figure 3:
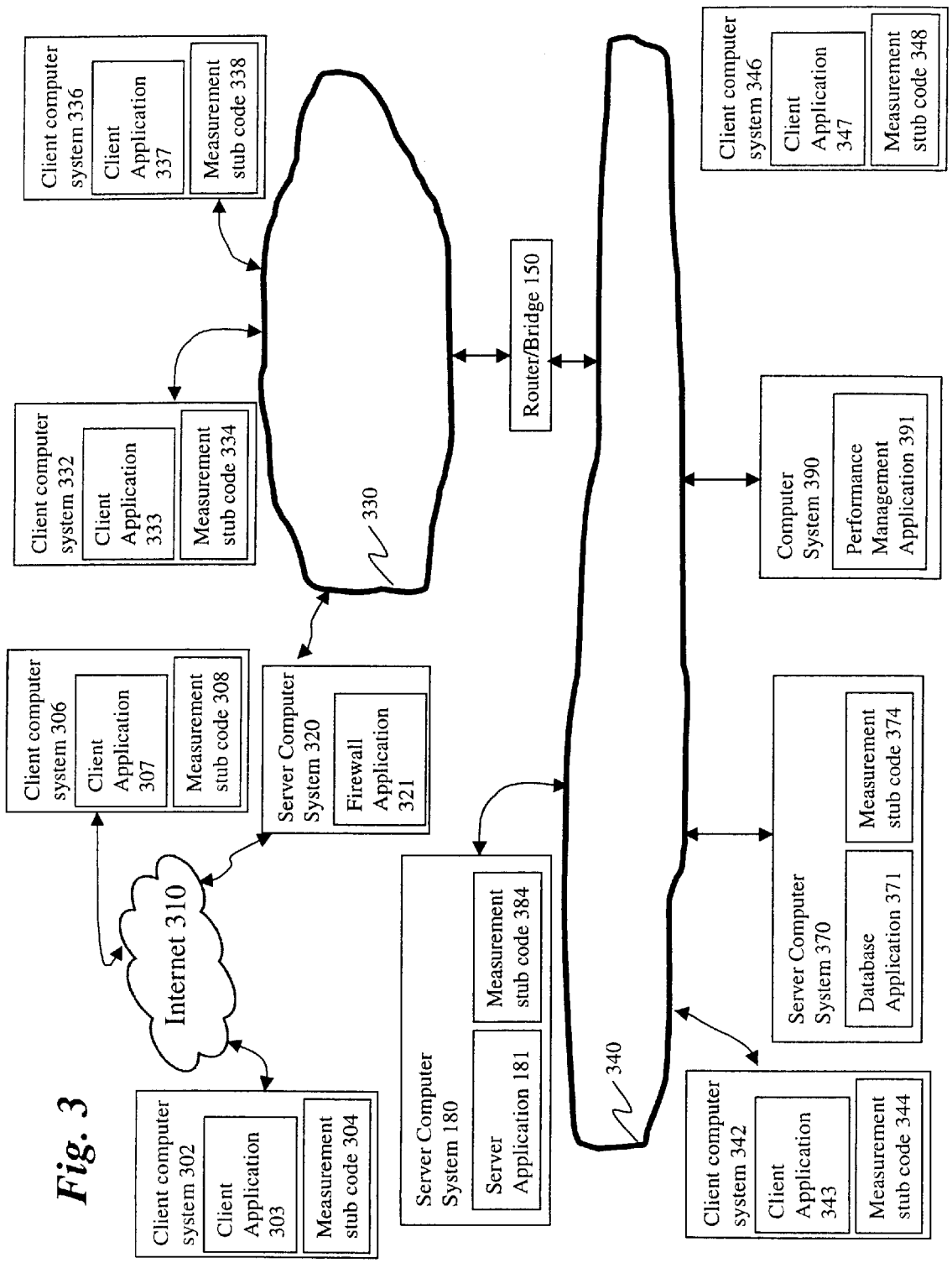
FIG. 3 illustrates one method of measuring performance statistics in the client-server computer system arrangement of FIGS. 1 and 2.

FIG. 3 illustrates one possible embodiment for a client-server application performance measurement system that monitors the performance of a client-server application system as illustrated in FIG. 1 and FIG. 2. The system includes a plurality of end user client computer systems 302, 306, 332, 336, 342, and 346. The system further includes server computer system 320 (having firewall application 321), server computer system 180 (having server application 181 and measurement sub code 384), and server computer system 370 (having database application 371 and measurement sub code 374). In the embodiment of FIG. 3, each client application program 303, 307, 333, 337, 343, and 347 has a piece of performance measurement stub code 304, 308, 334, 338, 344, and 348 respectively. The performance measurement stub code in each client system monitors when a client system sends out requests to the server application 181 and when the local client system receives a response back from the server application 181. Thus, by placing performance measurement stub code on a client system, the response time as seen from that particular client system can be measured.

To gain a more overall view of the performance of the client-server application system, the information gathered by each piece of performance measurement stub code 304, 308, 334, 338, 344, and 348 is sent to a performance management application 391 on a computer system 390. By collecting the performance numbers from a number of different client systems, the performance management application 391 can determine the overall performance of the client-server system.

The client-server application performance measurement system of FIG. 3 suffers from a number of problems. First of all, the client-server application performance measurement system of FIG. 3 is very difficult to install since performance measurement stub code must be installed into all the different client systems. In a large and widely distributed client-server system, such a task is complicated and expensive. The client-server application performance measurement system of FIG. 3 is also susceptible to incompatibility problems that may arise when the client application programs are upgraded to newer versions. Specifically, if the performance measurement stub code is tightly integrated with the client software, then an upgrade to the client application software may cause the performance measurement stub code to no longer function properly.

The distributed nature of the client-server application performance measurement system of FIG. 3 also introduces problems. To compare various packet times, each client and server in the system of FIG. 3 should have synchronized clocks. In practice, it is very difficult to initially synchronize and maintain synchronization of all the internal clocks of the clients and servers. Furthermore, to gain an overall understanding of the client-server application performance, each piece of performance measurement stub code must send its findings to a centralized performance management application 391. This network communication caused by the performance measurement stub code to performance management application 391 communications will add traffic to the network and thus reduce the performance of the client-server application. Furthermore, since it takes time for the performance management application 391 to collect and process the data from the various pieces of client performance measurement stub code, the performance management application 391 will not be able to report real-time performance measurements.

An Improved Performance Measurement System

The present invention introduces a new architecture for measuring the performance of a client-server application system. The system of the present invention operates by using a single centralized measurement system that monitors all the traffic received by and sent from the server application.

Improved Performance Measurement System Arrangement

Figure 4:
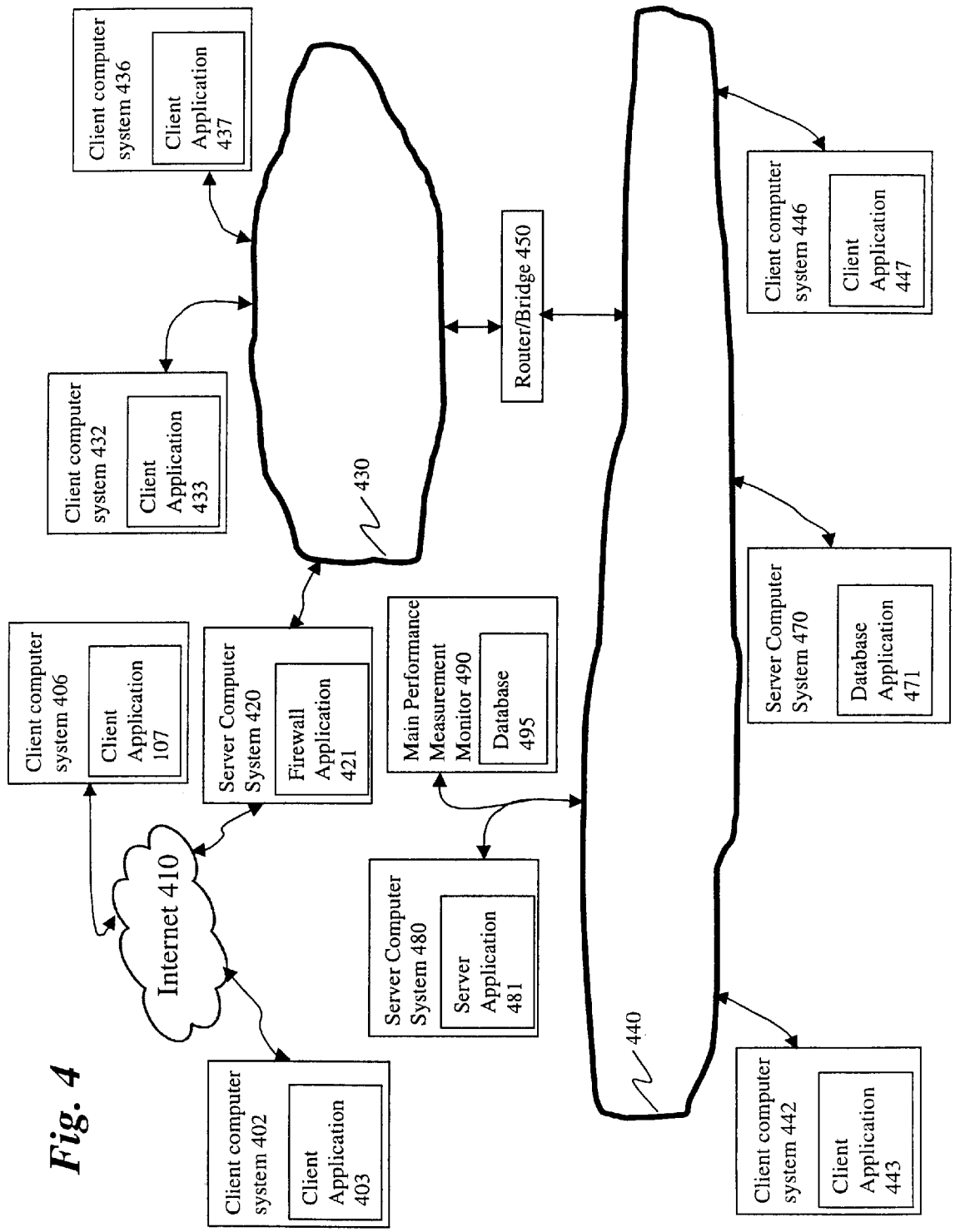
FIG. 4 illustrates the client-server network arrangement of FIGS. 1 and 2 with a main performance measurement monitor coupled to the network in close network proximity to a server system to be monitored.

FIG. 4 illustrates a block diagram of the client-server application environment of FIG. 1 wherein a main performance measurement monitor 490 according to the teachings of the present invention has been added to the computer network. The main performance measurement monitor 490 includes a database 495. The system includes a plurality of end user client computer 402, 406, 432, 436, 442, and 446, each having a client application program 403, 107, 433, 437, 443, and 447, respectively. As illustrated in the embodiment of FIG. 4, the only change made to the network is the addition of the main performance measurement monitor 490. Thus, in comparison to the complex performance monitoring system of FIG. 3 that requires code placed at each client system and each server system, the system of the present invention is easy to install. Furthermore, the single centralized main performance measurement monitor 490 of the present invention reports real-time performance statistics without introducing new traffic onto the computer network.

As illustrated in the FIG. 4, the main performance measurement monitor 490 is installed onto the network with close "network proximity" to the server application 481 running on server system 480. In this context, close network proximity means that the main performance measurement monitor 490 will receive the same packets that the server application 481 running on server system 480 receives. Furthermore, the main performance measurement monitor 490 will receive these packets at approximately the same time that the server application 481 running on server system 480 receives the packets.

The goal of close network proximity can be accomplished in a number of ways. In a 10 Base-T Ethernet network, the main performance measurement monitor 490 can be connected to the same network hub that the server system 480 is connected to. In a coaxial (i.e. 10 Base-2) Ethernet network, the transceiver for the main performance measurement monitor 490 should be coupled to the coaxial network cable in close physical proximity to the transceiver for the server system 480.

If the server system 480 is coupled to an Ethernet switch, then the main performance measurement monitor 490 should be coupled to a mirror or span port on the Ethernet switch. The mirror or span port is a port that broadcast all the traffic that the Ethernet switch receives from every port. If the Ethernet switch does not have a mirror or span port, then the main performance measurement monitor 490 should be coupled to a hub that couples all the client systems to an Ethernet switch port.

The main performance measurement monitor 490 operates by "sniffing" the packets destined for the server system 480 and originating from the server system 480. Sniffing refers to the observation and examination of packets that are not addressed to the entity performing the sniffing. In the present invention, the main performance measurement monitor 490 observes networks packets addressed to server application 481 running on server system 480 and network packets originating from the server application 481 running on server system 480. The packets addressed to server application 481 will include server application requests, database responses, acknowledgements from client systems, and other communication received by the server application 481. The network packets originating from the server application 481 will include server application responses, database requests, and acknowledgements to clients.

To perform the performance monitoring functions, the main performance measurement monitor 490 must be able to deeply understand and interpret the packets that the main performance measurement monitor 490 sniffs. The main performance measurement monitor 490 must be able to interpret the packet addressing that describes the entity that sent a particular packet and the entity that will receive the packet. Furthermore, the main performance measurement monitor 490 must be able to understand specific types of packets that are addressed to and originating from the server application 481 running on server system 480. For example, in a TCP/IP network environment the main performance measurement monitor 490 must be able to understand more than just the TCP and IP layers of packet headers. Specifically, the main performance measurement monitor 490 must be able to understand the packet structure used by the server application 481 running on server system 480. In the embodiment of a SAP R/3 application, the main performance measurement monitor 490 must be able to interpret the protocol used by SAP R/3 such that the main performance measurement monitor 490 can identify SAP R/3 client request packets, server response packets, server request packets, and database response packets.

The main performance measurement monitor 490 measures the client-server performance by sniffing and interpreting the packets addressed to and originating from the server application 481 running on server system 480. A prime usage of the main performance measurement monitor 490 is to determine the round-trip response time from when a client makes a request and when the client receives a response. Ideally, the round-trip response time should be broken down into subcategories that provide a breakout of how the time is used.

Simple Example Use of the Improved the Performance Measurement System

Figure 5:
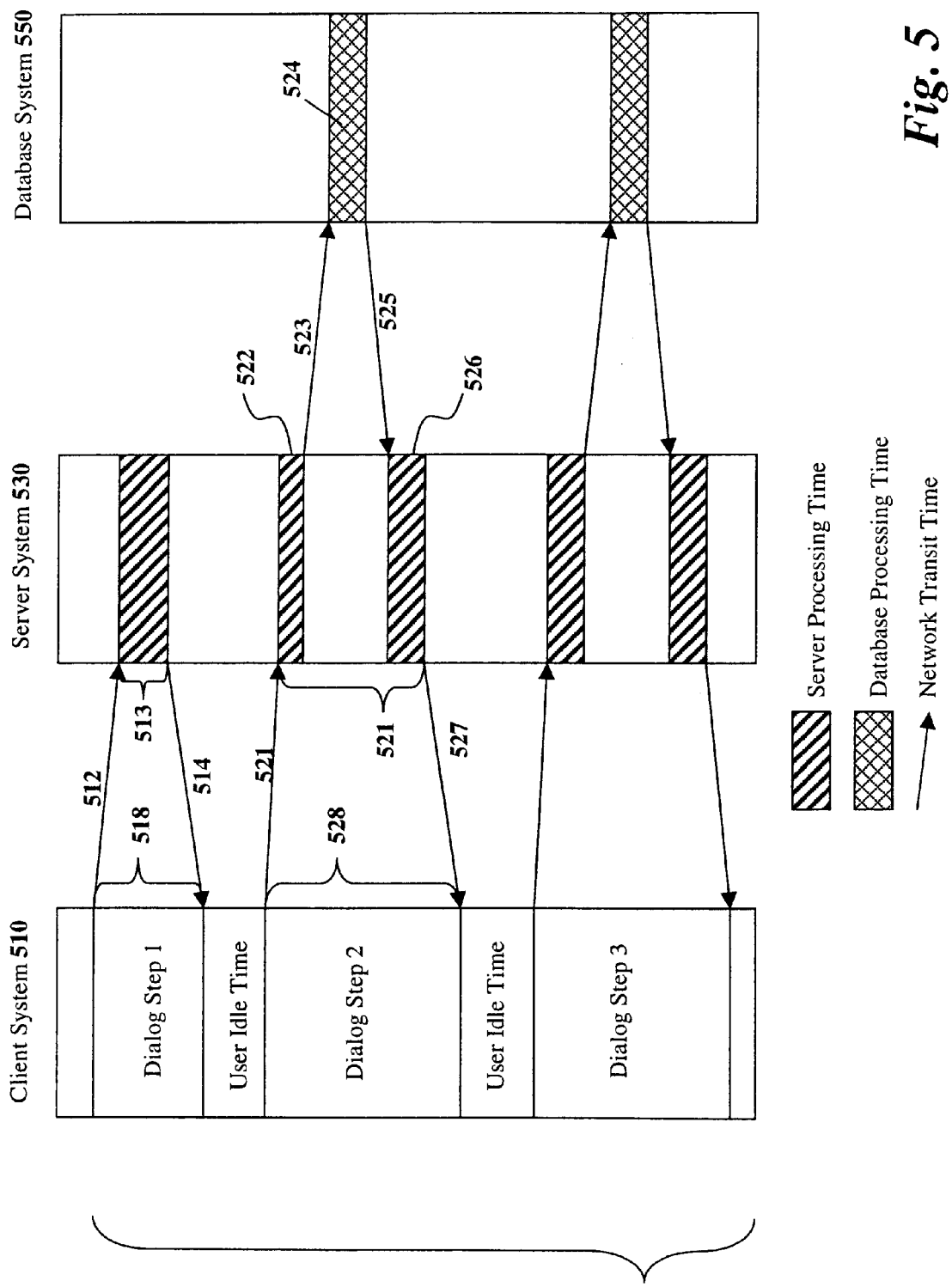
FIG. 5 illustrates a conceptual diagram that depicts a series of client and server transaction for completing a single data entry screen on one particular client-server application.

FIG. 5 illustrates a conceptual diagram that depicts a series of client and server transaction for completing a single data entry screen on the SAP R/3 enterprise management resource planning system. It should be noted that the illustration of FIG. 5 also equally describes many other types of client server transactions on other client-server applications. The data entry screen example of FIG. 5 includes three individual dialog steps.

The first dialog step, dialog step 1 (518), is a simple transaction between the client system 510 and the server system 530. The user enters information at the beginning of the dialog step 1. The client system 510 sends the request packet to the server system 530. This request packet transmission takes an amount of time known as the request transit time 512. The server system 530 processes the request and eventually generates a response. The time used by the server for processing the request is depicted as server processing time 513. The server system's response is transmitted back along the network to the client system 510. The time needed to transmit the fall response across the network is depicted as response transit time 514. From the client system's perspective, the total round-trip response time equals the request transit time 512 plus the server processing time 513 plus the response transit time 514.

Figure 6:
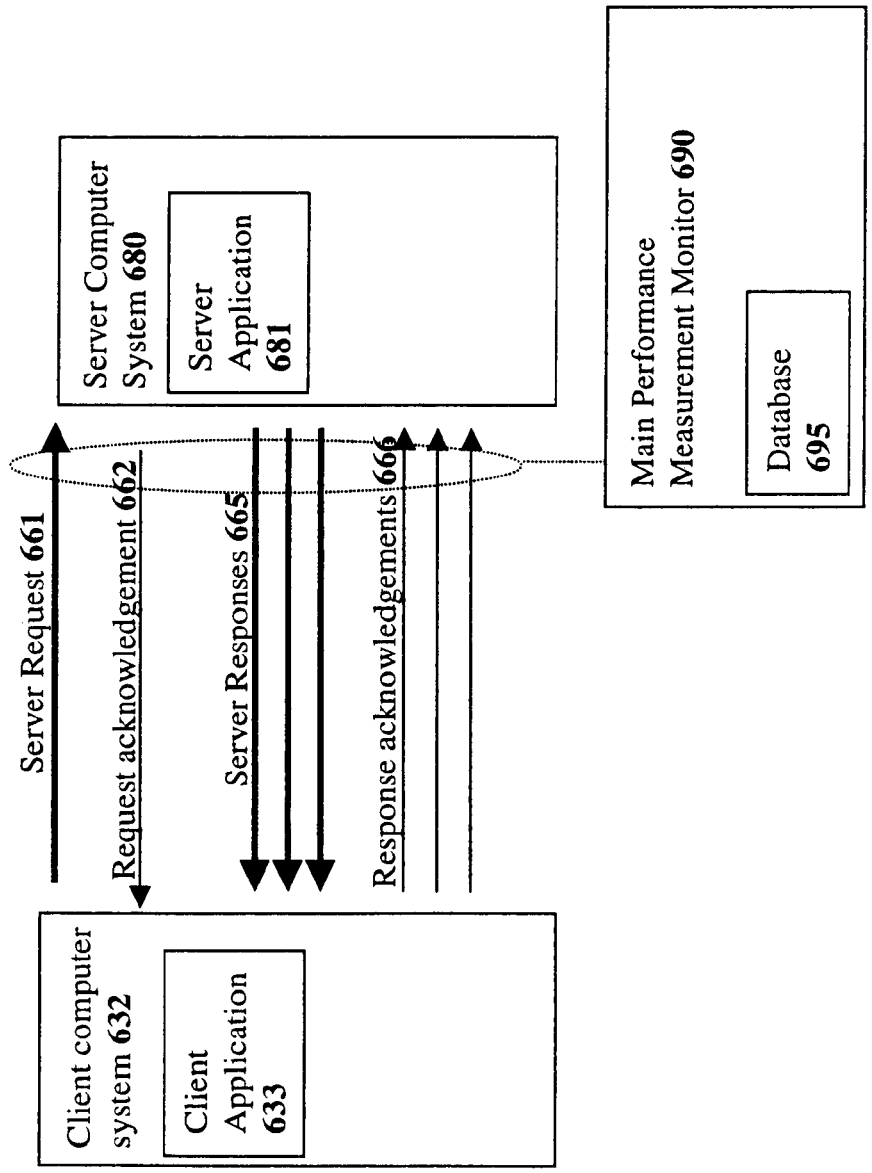
FIG. 6 illustrates the packet flow between a client application running on a client system and a server application running on a server system.

FIGS. 6 conceptually illustrates the packets that the main performance measurement monitor of the present invention sniffs to determine a round-trip response time for a simple client request and server response transaction. Specifically, FIG. 6 illustrates the packet flow between a client application 633 running on a client system 632 and a server application 681 running on a server system 680.

Referring to FIG. 6, a client application 633 running on a client system 632 initiates a client-server transaction by sending a server request 661 to the server application 681 running on the server system 680. The server application 681 acknowledges receipt of the server request 661 by sending back an acknowledgement packet 662. Next, the server application 681 processes the request packet and generates a response. The response is often large and may need to be broken into many packets. Thus, the server application 681 sends one or more response packets 665 back to the client application 633. After receiving each response packet 665, the client system 632 acknowledges receipt of the server response packet 665 by sending back an acknowledgement packet 666. The main performance monitor is indicated at 690 and database at 695.

Figure 7:
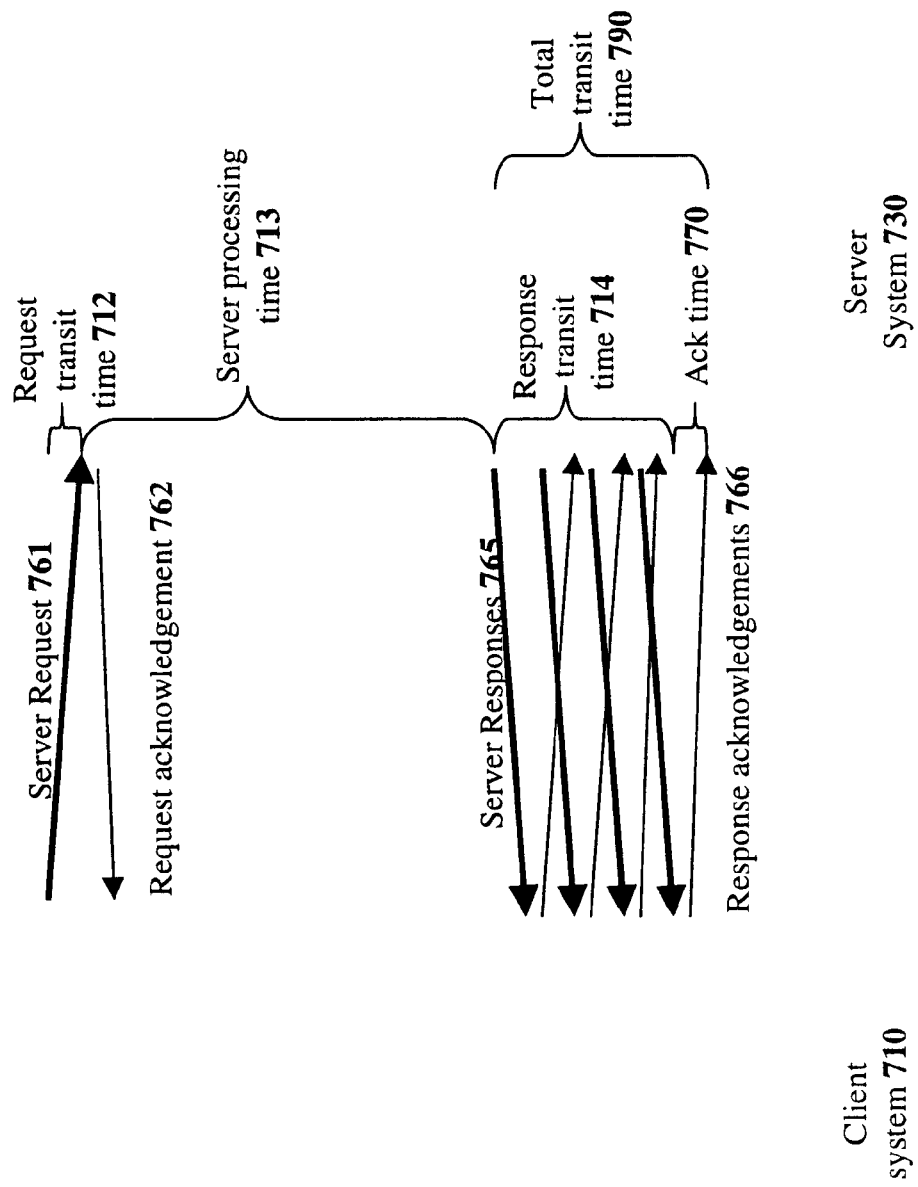
FIG. 7 provides a more detailed network communication diagram that illustrates the packet flow of FIG. 6.

FIG. 7 provides a more detailed diagram that illustrates the packet flow. Referring to FIG. 7, the client system 710 sends the server request 761 to the server system 730. Time that the server request 761 takes to travel from the client to the server is the request transit time 712. After receiving the server request 761, the server 730 processes the request. This time spent processing is the server processing time 713. The server formulates a response. If the response is large, then it may be broken into several response packets 765. Time from when the first response packet is sent until when the last response packet is received by the client is the response transit time 714.

Referring to FIG. 7, the main performance measurement monitor can accurately determine the server processing time 713 by subtracting the time the first response message is sent by the server from the time the request packet was received. However, the main performance measurement monitor of the present invention cannot directly measure the request transit time 712 since the main performance measurement monitor cannot determine when the client system sent the server request 761. Nor can the main performance measurement monitor directly determine the response transit time since the main performance measurement monitor cannot detect when the client system 710 receives the final response packet.

To determine the network transit time of the request and response, the present invention takes advantage of the fact that the time required to transmit last acknowledgement from the client system 710 to the server system 730 (known as ack time 770) very closely approximates the time required to transmit the server request 761 from the client system 710 to the server system 730 (the request transit time). Since those transit times are substantially equal, the total transit time can be calculated by measuring the time required to send all the response packets plus the time required to receive an acknowledgement packet back from the client system 710. Specifically, the total network transit time 790 can be very accurately estimated by subtracting the time the last acknowledgement is received from the client system 710 from the time the first server response packet was sent.

Figure 8:
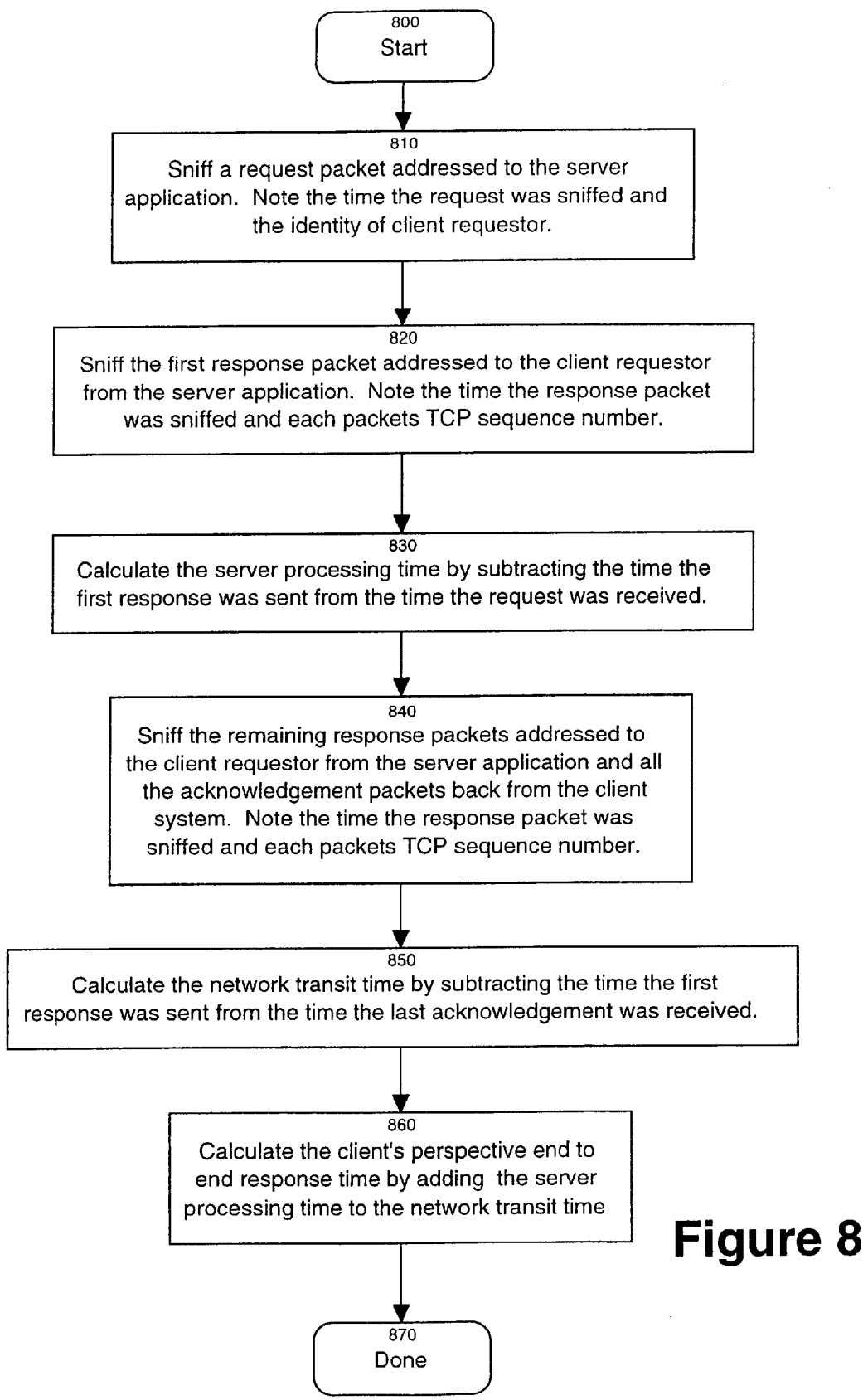
FIG. 8 provides a flow diagram describing the steps performed by the main performance measurement monitor to calculate server processing time a total transit time.

FIG. 8 provides a flow diagram describing the steps performed by the main performance measurement monitor to calculate server processing time and total transit time. As set forth in step 810 of FIG. 8, the main performance measurement monitor sniffs the request packet and notes the time the packet was sniffed and which client system sent the request packet. Next, in step 820, the main performance measurement monitor sniffs the first response packet sent by the server system. The main performance measurement monitor can then calculate the server processing time at step 830 by subtracting the time the first response packet was sent from the time the request packet was received.

The main performance measurement monitor continues monitoring packets in step 840. For each packet sniffed main performance measurement monitor notes the source, destination, TCP sequence number, and time such that the main performance will be able to correlate the packet with other packets. After the last response packet is sent and the last acknowledgement packet is received, the main performance measurement monitor can calculate the network transit time in step 850. Specifically, the main performance measurement monitor calculates the network transit time by subtracting the time the first response packet was sent from the time the last acknowledgement packet was received. Finally, the total end-to-end processing time, as seen from the client's perspective is calculated by adding the server processing time and the network transit time at step 860.

A More Complex Example Use of the Improved Performance Measurement System

Referring back to FIG. 5, Dialog step 2 (528) presents a more complex transaction. In dialog step 2, the server system 530 needs to obtain additional information from a database system 550. This step will add database request transit time 523, database processing time 524, and database response transit time 525. The request packet transmission time is 521 and the response transit time is 527. Server processing time is shown at 522 and 526. The present invention uses the same principles to determine these times. The client to server and server to client transit times can be calculated using the techniques in the previous section.

Figure 9:
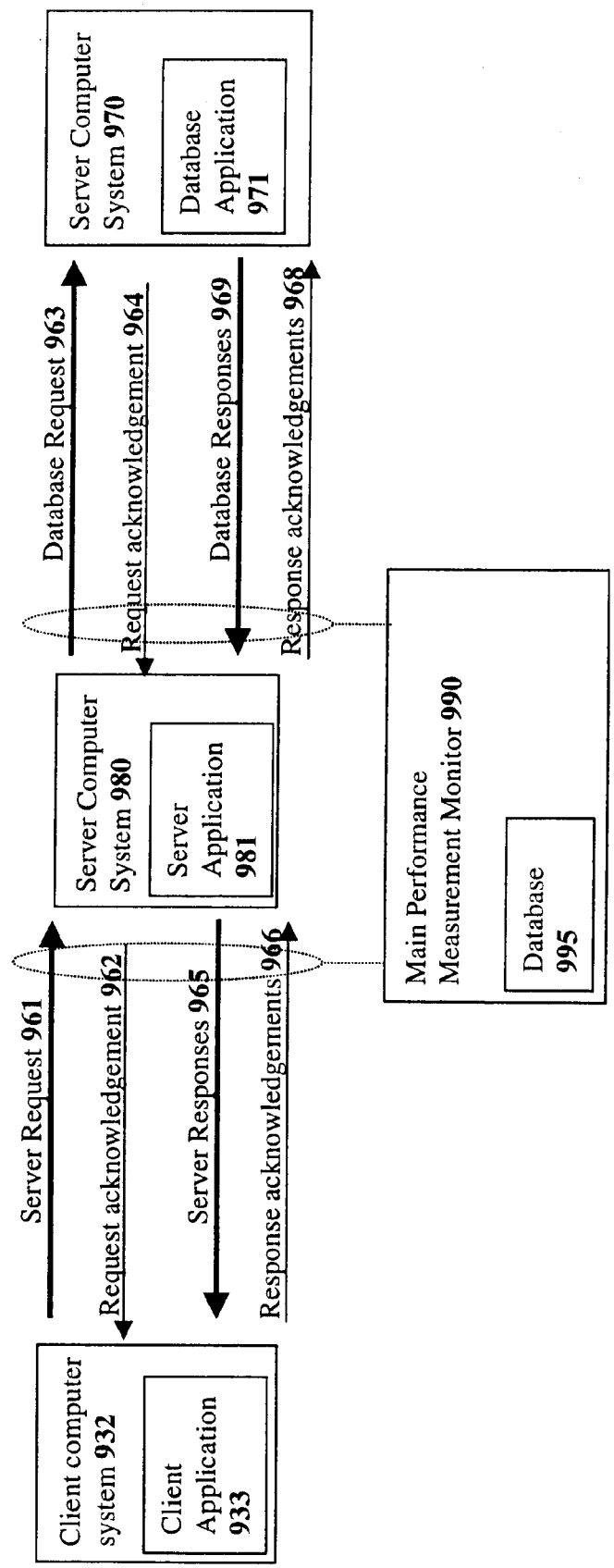
FIG. 9 illustrates the packets that the main performance measurement monitor sniffs to determine the processing and network transit times for a server request that requires database assistance.

FIG. 9 illustrates the packets that the main performance measurement monitor sniffs to determine the new times. The system includes client computer system 932 having client application 933, server computer systems 980 and 970 having server application 981 and database application 971, respectively, main performance monitor 990, and database 995. The database request packets 961, database response packets 965, and client acknowledge packets 966 are the same as set forth in FIG. 6. The new packets sniffed include the database request packet 963, the database acknowledge packet 964, and the database response packets 969.

Figure 10:
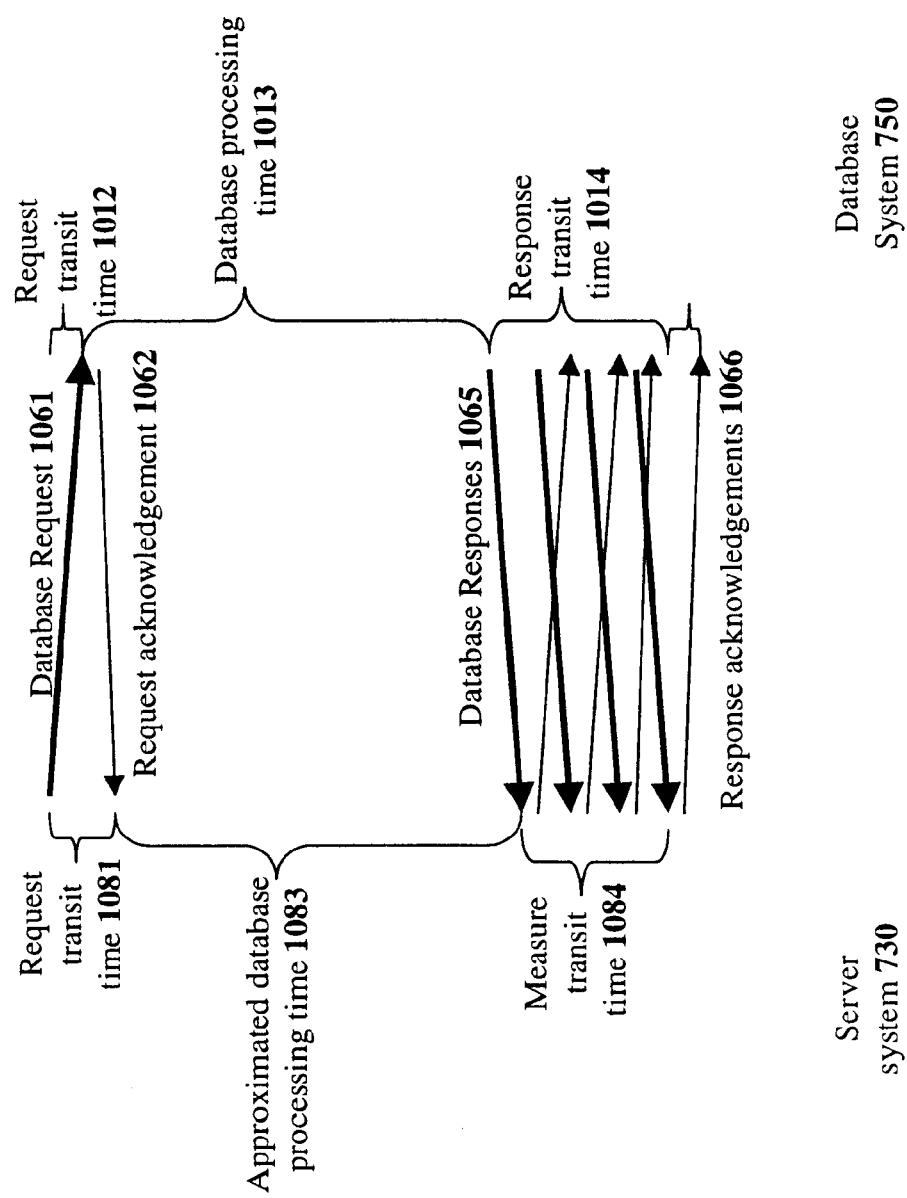
FIG. 10 illustrates more detailed network communication diagram that describes the packet flow between the server system and the database system in FIG. 6.
Figure 11:
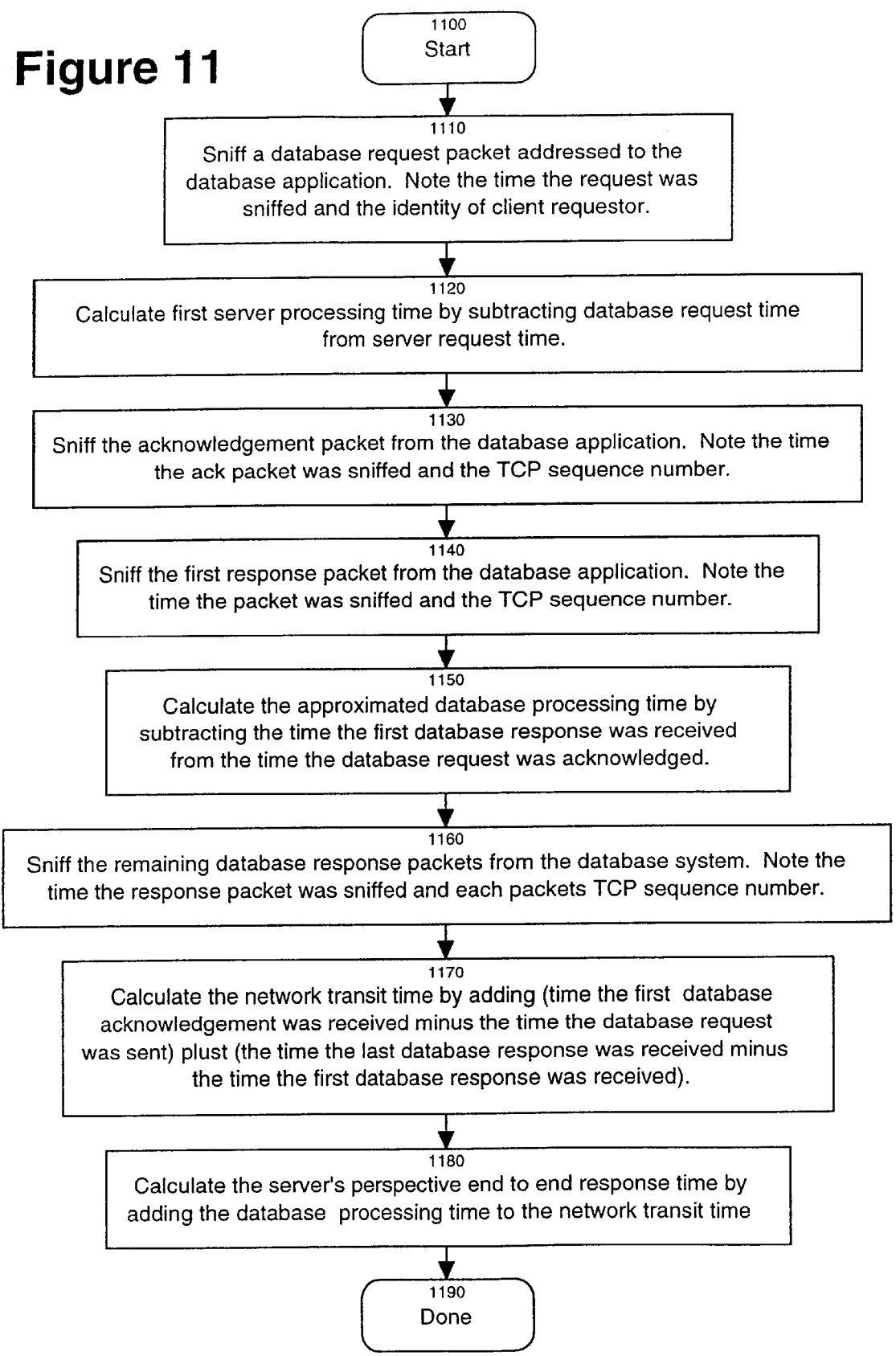
FIG. 11 sets forth the steps for calculating the database processing and database transit times.

FIG. 10 illustrates the packet transactions between the server system 730 and the database system 750. The main performance measurement monitor cannot directly measure the database request transit time 1012, the database processing time 1013, or the response transit time 1014. However, the database processing time and total transit time can be very closely approximated. Specifically, the database processing time and the total transit time may be closely approximated since the time the first database response takes to transit the network substantially equals the time the database request acknowledgement 1062 takes to transit the network. (See request transit time 1081, approximated database processing time 1083, and measure transit time 1084). FIG. 11 sets forth the steps for calculating the database processing and database transit times.

Referring to FIG. 11, the main performance measurement monitor first sniffs the database request packet at step 1110. Next, at step 1120, the main performance measurement monitor calculates the first server processing time by subtracting time the database request packet was sniffed from the time the server request packet was sniffed. At step 1130, the time the database acknowledgement packet is received is stored. The database performs its processing of the request.

At step 1140, the main performance measurement monitor sniffs the first response packet from the database system.

Using this response packet, the main performance measurement monitor calculates the approximated database processing time by subtracting the time the first database response was received from the time the database request was acknowledged. The main performance measurement monitor then sniffs the remaining response packets at step 1160.

After all the response packets have been received, the main performance measurement monitor calculates the total database transit time at step 1170 by adding the round-trip time of the request packet to the time from the first response packet was received until the time the last response packet was received. Specifically the total database transit time calculate by adding (first database acknowledgment time minus database request time was received) to (the last database response packet time minus the first database response packet time). Finally, the total end-to-end processing time, as seen from the server system's perspective, is calculated at step 1180 by adding the database processing time and the total database transit time.

Referring back to FIG. 5, the main performance measurement monitor can subsequent calculate the second server processing time 526 by subtracting the time the first database response packet is sent from the time the last database response packet is received.

By calculating the server processing time, the server network transit time, the database processing time, and the database transit time, the present invention provides the round-trip client response time and the individual break-out of how much time was used for server processing and how much time was used for network transit.

The foregoing has described a method and apparatus for measuring the performance of a client-server based application program. It is contemplated that changes and modifications may be made by one of ordinary skill in the art, to the materials and arrangements of elements of the present invention without departing from the scope of the invention.

I claim:

1. A method of monitoring the performance of a client-server application on a computer network, said method comprising:

coupling a performance monitor machine to said computer network in close network proximity to a first server system such that the performance monitor machine receives packets at approximately the same time that the first server system receives the packets;

sniffing from said performance monitor machine to determine a time when said first server system receives a request packet from a client system;

sniffing from said performance monitor machine to determine a time when said first server system sends a first response packet to said client system;

sniffing from said performance monitor machine to determine a time when said first server system receives a final acknowledgement packet from said client system; and calculating client-server transaction times using said times of said sniffed packets.

2. The method as claimed in claim 1 wherein said step of calculating further comprises:

calculating a first server processing time by subtracting said time when said first server system receives said request packet from a client system from said time when said first server system sends said first response packet to said client system.

3. The method as claimed in claim 1 wherein said step of calculating further comprises:

calculating a network transit time by subtracting said time when said first server system receives said final acknowledgement packet from said client system from said time when said first server system sent said first response packet to said client system.

4. The method as claimed in claim 2 wherein said step of calculating further comprises:

calculating a network transit time by subtracting said time when said first server system receives said final acknowledgement packet from said client system away from said time when said first server system sent said first response packet to said client system.

5. The method as claimed in claim 4 wherein said step of calculating further comprises:

calculating a total round-trip response time by adding said network transit time to said first server processing time.

6. The method as claimed in claim 1 wherein said final acknowledgement packet comprises a TCP acknowledgement packet.

7. The method as claimed in claim 1 wherein said first server system is executing a SAP R/3 application.

8. The method as claimed in claim 1 further comprising:

sniffing from said performance monitor machine to determine a time when said first server system sends a request packet to a second server system;

sniffing from said performance monitor machine to determine a time when said first server system receives an acknowledgement packet from said second server system;

sniffing from said performance monitor machine to determine a time when said first server system receives a first response packet from said second server system;

sniffing from said performance monitor machine to determine a time when said first server system receives a final response packet from said second server system; and calculating server-server transaction times using said times of said sniffed packets.

9. The method as claimed in claim 6 wherein calculating further comprises:

calculating a second server processing time by subtracting said time when said first server system receives said first response packet from said second server system from said time when said first server system receives said final response packet from said second server system.

10. The method as claimed in claim 8 wherein said step of calculating further comprises:

calculating a request round-trip transit time by subtracting said time when said first server system sends a request packet to a second server system from said time when said first server system receives an acknowledgement packet from said second server system;

calculating a total response receiving time by subtracting said time when said first server system receives a first response packet from said time when said first server system receives a final response packet from said second server system; and calculating a second server transit time by adding said request round-trip transit time to said total response receiving time.

11. An arrangement for monitoring the performance of a client-server application, said apparatus comprising:

a computer network, said computer network for carrying packets between a plurality of client systems coupled to said computer network and at least one server system coupled to said computer network;

performance monitor machine, said performance monitor machine coupled to said computer network in close network proximity to a first server system such that the performance monitor machine receives packets at approximately the same time that the first server system receives the packets, said performance monitor machine sniffing packets originating from said first server system and received by said first server system.

12. The arrangement as claimed in claim 11 wherein said performance monitor machine calculates a first server processing time by subtracting a time when said first server system receives said request packet from a client system from a time when said first server system sends said first response packet to said client system.

13. The arrangement as claimed in claim 11 wherein said performance monitor machine calculates a network transit time by subtracting a time when said first server system receives a final acknowledgement packet from a client system from said time when said first server system sent said first response packet to said client system.

14. The arrangement as claimed in claim 12 wherein said performance monitor machine calculates a network transit time by subtracting said time when said first server system receives said final acknowledgement packet from said client system from said time when said first server system sent said first response packet to said client system.

15. The arrangement as claimed in claim 14 wherein said performance monitor machine calculates a total round-trip response time by adding said network transit time to said first server processing time.

16. The arrangement as claimed in claim 13 wherein said final acknowledgement packet comprises a TCP acknowledgement packet.

17. The arrangement as claimed in claim 11 wherein said first server system is executing a SAP R/3 application.

18. The arrangement as claimed in claim 11 wherein said performance monitor machine calculates a second server processing time by subtracting a time when said first server system receives a first response packet from said second server system in response to a request packet sent to said second server system from a time when said first server system receives said final response packet from said second server system.

19. The arrangement as claimed in claim 11 wherein said performance monitor machine calculates a request round-trip transit time by subtracting a time when said first server system sends a request packet to a second server system from said time when said first server system receives an acknowledgement packet from said second server system, a total response receiving time by subtracting a time when said first server system receives a first response packet from said second server system from a time when said first server system receives a final response packet from said second server system, and a second server transit time by adding said request round-trip transit time to said total response receiving time.

20. The arrangement as claimed in claim 18 wherein said performance monitor machine calculates a request round-trip transit time by subtracting a time when said first server system sends a request packet to a second server system from said time when said first server system receives an acknowledgement packet from said second server system, a total response receiving time by subtracting a time when said first server system receives a first response packet from said second server system from a time when said first server system receives a final response packet from said second server system, and a second server transit time by adding said request round-trip transit time to said total response receiving time.

21. An arrangement for monitoring the performance of a client-server application, said apparatus comprising:

a computer network, said computer network for carrying packets between a plurality of client systems coupled to said computer network and at least one server system coupled to said computer network;

performance monitor machine, said performance monitor machine coupled said computer network in close network proximity to a first server system, said performance monitor machine sniffing packets originating from said first server system and received by said first server system, said performance monitor machine configured to calculate a request round-trip transit time by subtracting a time when said first server system sends a request packet to a second server system from said time when said first server system receives an acknowledgement packet from said second server system, a total response receiving time by subtracting a time when said first server system receives a first response packet from said second server system from a time when said first server system receives a final response packet from said second server system, a second server transit time by adding said request round-trip transit time to said total response receiving time, a second server processing time by subtracting a time when said first server system receives a first response packet from said second server system in response to a request packet sent to said second server system from a time when said first server system receives said final response packet from said second server system, and a total second server response time by adding said second server processing time to said second server transit time.

22. The arrangement as claimed in claim 11 further comprising:

a database first server coupled to said computer network.

* * * * *